United States Patent Office 2,927,897
Patented Mar. 8, 1960

2,927,897
FERROMAGNETIC MATERIAL

Johannes Antonius Schulkes, Evert Willem Gorter, and Hugo Gerrit Beljers, Eindhoven, Netherlands, assignors, by mesne assignments, to North American Philips Company, Inc., New York, N.Y., a corporation of Delaware No Drawing. Application June 18, 1956
Serial No. 591,803

Claims priority, application Netherlands June 16, 1955

4 Claims. (Cl. 252—62.5)

Our invention relates to ferromagnetic materials, more particularly to ferrite materials suitable for use with microwave frequencies and the manufacture thereof.

One of the most important applications for ferromagnetic ferrites are in gyrators and unilaterally permeable transmission systems.

Ferrite materials suitable for these purposes must fulfil the following requirements:

(a) The specific resistance must exceed 0.5M ohm./cm.

(b) At frequencies of about 10 kc./s. the initial permeability must exceed 15.

(c) $4\pi M$ is lower than $f/2.8$, wherein M designates the saturation magnetization of the ferrite material in Gauss and $f$ designates the frequency of the micro-wave in mc./s. (see J. Smit and H.P.J. Wijn "Advances in Electronics and Electron Physics," 6, 1954, page 108).

This means that for frequencies of about 4000 mc./s., for which the ferrite material according to the invention is intended, the value of $4\pi M$ must be lower than 1500 oersted. It is furthermore obvious that within the temperature range of the operations (0° C. to 50° C.) the saturation magnetization must be substantially constant.

(d) The Curie temperature must exceed 150° C.

In addition, these ferrite materials must have minimum eddy current losses.

The known ferrites that fulfil these requirements are few in number and are costly to prepare.

A principal object therefore of our invention is to provide additional ferromagnetic materials which meet the above requirements.

An additional object of our invention is to provide a less expensive method for the preparation of such ferromagnetic materials.

These and further objects of our invention will be apparent as the specification progresses.

According to our invention we prepare ferrites whose properties meet the above stated requirements by firing or sintering mixtures of a manganeses oxide, ferric oxide and alumina.

More particularly, according to our invention we prepare ferrites having the desired properties by firing and/or sintering between 1200° C. and 1400° C. a mixture having a composition corresponding to 50 to 57 mol. percent of MnO, 2 to 25 mol. percent of $Al_2O_3$ and 21.5 to 47.5 mol. percent of $Fe_2O_3$.

In this mixture the oxides themselves need not be used but may be replaced wholly or partially by compounds that are converted to the oxides under the conditions of the process, for example carbonates and salts of volatile acids such as aluminium carbonate, manganese carbonate, and ferric nitrate.

The invention will now be more fully illustrated by the following examples.

In these examples use was made of electro-megnetic waves of a frequency of about 4000 mc./s. These waves traversed a wave guide containing a plate of ferrite material 60 x 22 x 1 mms. and prepared according to the invention. This plate was magnetized at right angles to the direction of propagation of the micro-waves by means of a magnetic field which was strong enough to produce gyromagnetic resonance phenomena in the plate (here about 1050 oersted). The quality of the ferrite material may be expressed by means of magnitude termed herein the "quality factor." This is to be understood to mean the attenuation of the micro-waves concerned in a direction opposite to the direction of propagation divided by attenuation of the micro-waves in the direction of propagation. The damping, expressed in the decibels, in the numerical value is equal to 10 log $E_i/E_d$, wherein $E_i$ designates the incident wave energy per unit time and $E_d$ the passed wave energy per unit time.

Example 1

A mixture of manganese carbonate, ferric oxide and alumina in a ratio of about 50 mol. percent of MnO, 19 mol. percent of $Al_2O_3$ and 31 mol. percent of $Fe_2O_3$ was ground in a ball mill for 10 to 15 hours with water and then prefired at 1000° C. in air for two hours. After cooling the reaction product was ground again with water for 10 to 15 hours. Of the powder thus obtained were moulded plates and rings, which were heated at a temperature of 1350 to 1370° C. in air for four hours and then cooled also in air. On the plates and rings thus obtained were measured the following properties.

Initial permeability $(\mu_0)$ = 15 to 20
Specific resistance $(\rho)$ = 2M ohm cm.
Curie temperature about 185° C.
$4\pi M$ = about 1150 oersted A rectangular plate having a size of 60 x 22 x 1 mms. of this material, arranged in a wave guide for frequencies of about 4000 mc./s., yielded a forward attenuation of about 0.6 decibel and a reverse attenuation of 26 decibels in a wide frequency range. Therefrom is calculated a quality factor of $$\frac{26}{0.6}=43$$

Materials of corresponding properties were obtained also in accordance with the following examples, the details of otherwise completely identical with those which were otherwise completely identical with those described in Example 1.

Example 2

The starting material was a mixture of a composition corresponding to about 57 mol. percent of MnO, 2 mol. percent of $Al_2O_3$ and 41 mol. percent of $Fe_2O_3$. The final firing was for four hours in oxygen at 1260° C., the other manufacturing conditions being equal to those described in the preceding example. The properties of the bodies thus obtained were as follows:

Initial permeability $(\mu_0)$ = 45 to 50
Specific resistance $(\rho)$ = 1M ohm cm.
Curie temperature about 230° C.
$4\pi M$ = about 3420 oersted A rectangular plate having a size of 60 x 22 x 1 mms. of this material, arranged in a wave guide for frequencies of about $10^4$ mc./s., yielded a forward attenuation of 2 decibels and a reverse attenuation of 52 decibels in a wide frequency range. Therefrom is calculated a quality factor of $$\frac{52}{2}=26$$

While we have described our invention in connection with specific embodiments and applications, other modi-

What is claimed is:

1. A method of producing ferromagnetic materials, particularly suitable for use at micro-wave frequencies comprising the steps preparing a mixture of compounds of manganese, aluminum, and iron yielding upon heating the respective oxides in proportions of about 50 to 57 mol. percent of MnO, 2 to 25 mol. percent of $Al_2O_3$, and 21.5 to 47.5 mol. percent of $Fe_2O_3$, firing said mixture at a temperature between about 1200° C. and 1400° C. in an atmosphere containing at least as much oxygen as air, and cooling the reaction mixture in said atmosphere.

2. A method of producing ferromagnetic materials, particularly suitable for use at micro-wave frequencies comprising the steps preparing a mixture of about 50 to 57 mol. percent of MnO, 2 to 25 mol. percent of $Al_2O_3$, and 21.5 to 47.5 mol. percent of $Fe_2O_3$, firing said mixture at a temperature between about 1200° C. and 1400° C. in an atmosphere containing at least as much oxygen as air, and cooling the reaction mixture in said atmosphere.

3. The method of claim 1 in which a mixture of manganese carbonate, aluminum carbonate and ferric oxide is fired.

4. A ferromagnetic ferrite particularly suitable for use at microwave frequencies formed by heating at a temperature of about 1200° C. to 1400° C. in an atmosphere containing as much oxygen as air, about 50 to 57 mol. percent of MnO, about 2 to 25 mol. percent $Al_2O_3$, and about 21.5 to 47.5 mol. percent $Fe_2O_3$.

References Cited in the file of this patent

UNITED STATES PATENTS 2,576,456  Harvey _____ Nov. 27, 1951

OTHER REFERENCES

"Physica III," No. 6, June 1936, pp. 463–482, pp. 469 and 481.

"J. Recherches Centre Nat'l," 1950, Chas. Guilland, Recherche Sci. (Labs. Bellevue), pp. 113–122.

"Journal of Electronics," vol. 1, No. 1, July 1955, pp. 64–77.